(12) United States Patent
Hafner et al.

(10) Patent No.: US 12,447,522 B2
(45) Date of Patent: Oct. 21, 2025

(54) METHOD FOR OPERATING A SERVO MOTOR DRIVEN TURNING STATION OF A STACKING TOOL FOR A PUNCH PRESS

(71) Applicant: BRUDERER AG, Frasnacht (CH)

(72) Inventors: Josef Thomas Hafner, Rorschacherberg (CH); Herbert Högger, Götzis (AT); Manuel Bühler, Arbon (CH)

(73) Assignee: BRUDERER AG, Frasnacht (CH)

( * ) Notice: Subject to any disclaimer, the term of this patent is extended or adjusted under 35 U.S.C. 154(b) by 319 days.

(21) Appl. No.: 18/043,866

(22) PCT Filed: Sep. 3, 2020

(86) PCT No.: PCT/EP2020/074551
§ 371 (c)(1),
(2) Date: Mar. 2, 2023

(87) PCT Pub. No.: WO2022/048750
PCT Pub. Date: Mar. 10, 2022

(65) Prior Publication Data
US 2023/0294158 A1 Sep. 21, 2023

(51) Int. Cl.
*B21D 43/22* (2006.01)
*B21D 28/06* (2006.01)
*G05B 19/18* (2006.01)

(52) U.S. Cl.
CPC .............. *B21D 43/22* (2013.01); *B21D 28/06* (2013.01); *G05B 19/182* (2013.01); *G05B 2219/45131* (2013.01)

(58) Field of Classification Search
CPC ...... B21D 43/22; B21D 28/06; G05B 19/182; G05B 2219/45131; G05B 19/416; H02K 15/02

(Continued)

(56) References Cited

U.S. PATENT DOCUMENTS

| 5,915,750 A | 6/1999 | Usher et al. |
| 5,963,003 A * | 10/1999 | Boyer ............... G05B 19/19 |
| | | 318/568.23 |

(Continued)

FOREIGN PATENT DOCUMENTS

JP 4355520 B2 11/2009

OTHER PUBLICATIONS

International Search Report mailed on May 31, 2021, in connection with International Application No. PCT/EP2020/074551 (5 pp., including machine-generated English translation).

*Primary Examiner* — David Luo
(74) *Attorney, Agent, or Firm* — McCormick, Paulding & Huber PLLC

(57) ABSTRACT

A method for operating a servo motor (10) driven turning station (5, 6, 7) of a stacking tool for a punch press includes the following steps: determining a target turning acceleration curve of the turning station (5, 6, 7) in the acceleration phase (A) of the turning increment (D); carrying out a reference acceleration run of the turning station (5, 6, 7); determining during the reference acceleration run the reference angular velocity (ωref) of the turning station (5, 6, 7); determining from the target turning acceleration curve the target angular velocity (ωsoll); calculating a target drive torque of the servo motor, at which the target angular velocity (ωsoll) results, from the relationship, known from the reference acceleration run; and accelerating the turning station (5, 6, 7) with the servo motor (10) in the acceleration phase (A).

17 Claims, 6 Drawing Sheets

(58) Field of Classification Search
USPC .................................. 318/255, 276, 560
See application file for complete search history.

(56) References Cited

U.S. PATENT DOCUMENTS

| | | | |
|---|---|---|---|
| 7,603,188 B2* | 10/2009 | Maeda | G05B 7/02 |
| | | | 318/578 |
| 2010/0052463 A1 | 3/2010 | Saito et al. | |
| 2019/0163209 A1 | 5/2019 | Xiong et al. | |

* cited by examiner

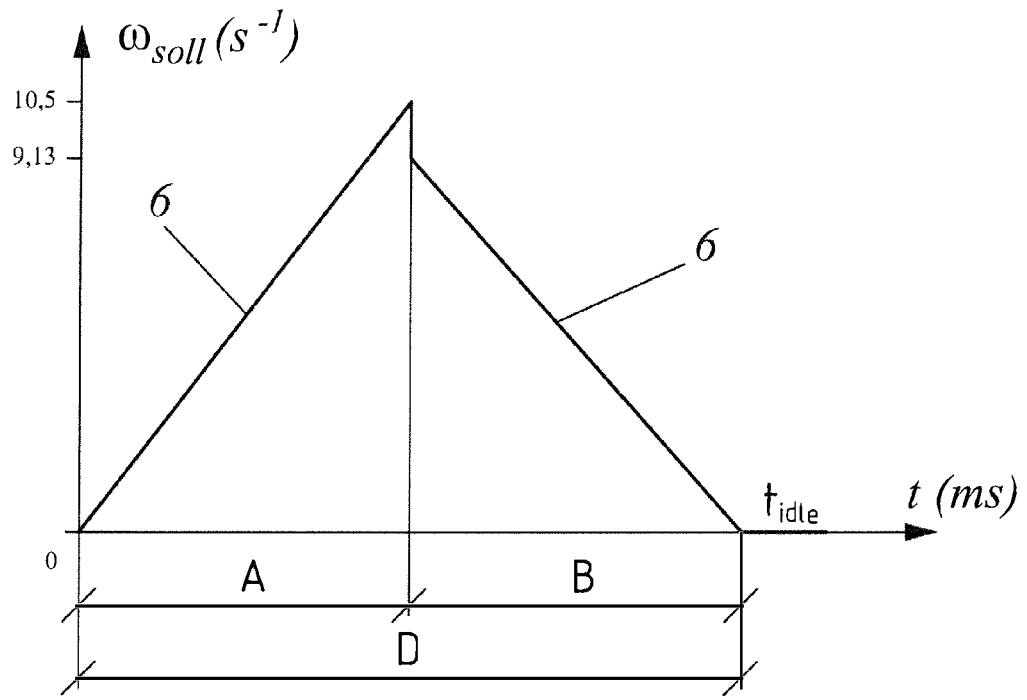
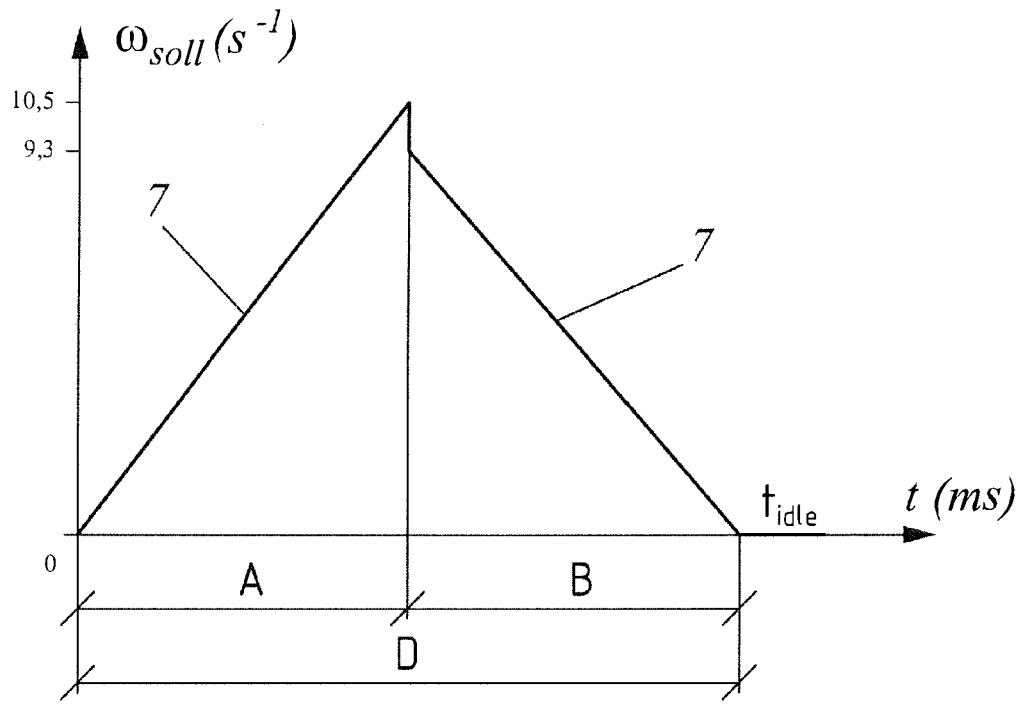

METHOD FOR OPERATING A SERVO MOTOR DRIVEN TURNING STATION OF A STACKING TOOL FOR A PUNCH PRESS

CROSS-REFERENCE TO RELATED APPLICATION

This application is a National Stage application of International Patent Application No. PCT/EP2020/074551, filed on Sep. 3, 2020, which is hereby incorporated by reference in its entirety.

TECHNICAL FIELD

The present invention relates to a method of operating a servo motor-driven turning station of a stacking tool for a punch press, and to a punch press having a stacking tool with a servo motor-driven turning station according to the preamble of the independent patent claims.

BACKGROUND

In the production of electric motors in large series, the punching process for manufacturing the sheet metal packs for the rotor and the stator has become indispensable. In this process, the individual sheets are punched out of a metal strip in a punch press, stacked in stamping dies, and joined together to form sheet packs of the target height. To prevent that any differences in sheet thickness across the stack width from lead to skewed stacks of sheets, the stacks of sheets are rotated by a certain increment before each new sheet is placed on the stack by a turning station of the respective stacking tool. Here, any differences in sheet thickness are automatically compensated for during packaging. However, with today's standard punching speeds and servo motor-driven turning stations, this turning is a challenge because the sheet packs have relatively high mass inertias and there is very little time available to accelerate and decelerate the respective sheet pack with the turning station.

Particularly in the case where both the rotor and stator sheet packs of an electric motor are produced on a punching press with the same die, the operating parameters for the turning stations of the individual sheet packs differ greatly because the masses and turning moments of inertia are very different due to the different weights and diameters of the sheet packs. For example, it is not uncommon for the turning inertia of a turning station with a rotor sheet pack to be one to two powers of ten smaller than the turning inertia of a turning station with the associated stator sheet pack. In practice, this means that it takes a great deal of time and experience to iteratively adjust the turning stations to the respective production job, and that in most cases the turning stations are nevertheless operated with suboptimal motion profiles, in which unnecessarily high accelerations and/or decelerations are used because it is not possible to set a specific motion profile and it must always be ensured that the respective turning increment can be completed in the available time. However, this unnecessarily consumes energy and also causes unnecessary wear on the production equipment. In addition, the unnecessarily high acceleration values can lead to oscillations in the system, which have a negative impact on the production result.

SUMMARY

The objective is therefore to provide a technical solution that does not have the aforementioned disadvantages of the state of the art or at least partially avoids them.

This objective is solved by the method and the punch press according to the independent patent claims.

According to these, a first aspect of the invention relates to a method of operating a servo motor-driven turning station of a stacking tool for a punch press.

In this case, a target turning acceleration process of the turning station is defined in the acceleration phase of the turning increment, and advantageously in such a way that the most energy-efficient movement profile possible is provided without unnecessarily large accelerations.

One or more of the following target parameters are determined from the target rotational acceleration curve:
 the target turning acceleration, which is to be present over a certain turning range;
 the target angular velocity, which should be present when a certain turning angle is reached;
 the target turning time which should have elapsed when a certain turning angle is reached;
 the target turning angle, which should be present when a certain turning time is reached.

In addition, a reference acceleration run of the turning station is performed to determine the dynamic behaviour of the turning station, or, in other words, the relationship between the drive torque of the servo motor and/or the supply current of the servo motor and the turning acceleration of the turning station. The turning acceleration of the turning station can also be expressed here by an angular velocity upon reaching a certain turning angle, a turning time until reaching a certain turning angle and/or a turning angle after reaching a certain turning time.

For the reference acceleration run, the turning station, which is provided with a stack of sheets or a "dummy" representing this stack of sheets, is accelerated by the servo motor during the reference acceleration run while providing a specific reference drive torque or while supplying the servo motor with a specific reference supply current, and one or more of the following reference parameters of this reference acceleration run is determined:
 the reference turning acceleration of the turning station or servo motor achieved over a specific turning range;
 the reference angular velocity of the turning station or servo motor when a certain turning angle is reached;
 the reference turning time elapsed until a certain turning angle is reached;
 the reference turning angle present after a certain turning time has elapsed.

With the determined target parameters and the determined reference parameters, a target drive torque of the servo motor and/or a target supply current of the servo motor is then calculated via the relationship between the reference turning acceleration, the reference angular velocity, the reference turning time and/or the reference turning angle and the drive torque of the servo motor and/or the supply current of the servo motor, which is known from the reference acceleration run, in which, in the intended operation, the target turning acceleration in the certain turning range, the target angular velocity when the target turning angle is reached, the target turning time when the certain turning angle is reached and/or the target turning angle after the certain turning time has elapsed are obtained.

The determination of the target parameters and the determination of the reference parameters can basically be carried out independently of each other and therefore do not require a fixed sequence. However, it is advantageous for easy processing of the target and reference parameters if identical certain turning ranges, identical certain turning angles and/or identical certain rotation times are used for their determination. Otherwise, target and reference parameters that are determined or established for non-identical certain turning ranges, turning angles and/or rotation times can nevertheless be evaluated or compared via the known relationship between the drive torque of the servo motor and/or the supply current of the servo motor and the turning acceleration, angular velocity, turning time and/or the turning angle.

Then, in normal production operation, the turning station is accelerated with the servo motor in the acceleration phase of the respective turning increment while the target drive torque is provided by the servo motor or while the servo motor is supplied with the target supply current.

With the method according to the invention, it is possible to set and optimize the movement profiles of servo-motor-driven processing stations of stacking tools in a short time and without a lot of experience, using an actual "teach-in" operation.

Advantageously, a target rotational acceleration curve is defined in which the turning station is accelerated essentially uniformly in the acceleration phase of the turning increment. "Essentially uniform" is to be understood here as meaning that the acceleration is uniform over the majority of the acceleration phase, although it is perfectly conceivable and may also be desirable to specify a lower acceleration at the start and end of the acceleration phase or smooth transitions from standstill at the start of the acceleration phase and at the end of the acceleration phase into the deceleration phase.

It is also preferred that the reference acceleration run is performed by providing the nominal drive torque of the servo motor as the reference drive torque or by supplying the servo motor with the nominal supply current as the reference supply current.

In this way, it becomes immediately apparent if the specified target values cannot be implemented by the existing servo motor. It is then necessary to reduce the number of strokes of the press accordingly or to use a more powerful servo motor.

In a preferred embodiment of the method, the turning angle of the turning station is determined per turning increment and the reference acceleration run is performed over a certain range of the turning angle, e.g. over half or the entire turning angle.

In another preferred embodiment of the method, the available turning time per turning increment is determined and the reference acceleration run is performed over a certain range of the turning time, e.g. over half or all of the available turning time.

Depending on which parameters are used to calculate the target drive torque or the target supply current of the servo motor, one or the other embodiment of the method may be more advantageous.

In a further preferred embodiment of the method according to the invention, both the available turning time per turning increment and the turning angle of the turning station per turning increment are determined, and a target rotation acceleration curve is defined according to which half the turning angle is reached at the end of or after the end of half the available turning time.

It is preferred that a target turning acceleration curve is defined, according to which the acceleration phase of the turning increment is completed when the half-turning angle is reached or after it has been reached.

In this way, energy-efficient motion profiles are favored without unnecessarily large accelerations.

In the method variants in which the available turning time per turning increment is determined, it is advantageous to determine this turning time per turning increment in such a way that a theoretically available turning time per turning increment is reduced by a time period which is provided for calming the system at the end of the turning movement. This ensures that any system vibrations have decayed before the next sheet is stacked on the sheet stack in the turning station.

It is also advantageous in the method variants in which the available turning time per turning increment is determined that the available turning time per turning increment or the theoretically available turning time per turning increment is determined as a function of the target stroke rate of the press or as a function of the current stroke rate of the press. In the latter case, the turning acceleration curve or the movement profile of the turning station can be dynamically adapted to the press speed, and a movement profile optimized for energy and wear can be used for the operating situation.

In yet another preferred embodiment of the method, the target turning acceleration of the turning station is defined over the entire turning increment, i.e. for the acceleration phase and the deceleration phase, preferably in such a way that the deceleration phase begins directly after the acceleration phase. This allows the entire available turning time to be used for acceleration and deceleration, and results in particularly energy-efficient motion profiles if the available time is divided approximately in half between the acceleration phase and the deceleration phase.

It is preferred that a target turning deceleration is determined, which should be present in the deceleration phase according to the target rotational acceleration curve. With the determined target turning deceleration and the determined reference parameters, a target braking torque of the servo motor and/or a target braking supply current is calculated via the relationship between the reference turning acceleration, the reference angular velocity, the reference turning time and/or the reference turning speed known from the reference acceleration run, at which target braking torque and/or target braking supply current the target turning deceleration results in operation as intended. Subsequently, the turning of the turning station with the servo motor is decelerated in the deceleration phase of the turning increment by providing the target braking torque by the servo motor or by supplying the servo motor with the target braking supply current.

In this way, the deceleration phase of the turning increment can also be set and optimized in a targeted manner via "teach-in" operation in a very short time and without much experience.

Further optimization is possible if the friction loss braking torque of the turning station and/or a feed current corresponding to the friction loss braking torque is determined if possible before the target turning speed of the turning station is defined and is taken into account when defining the target turning speed of the turning station. This can be done, for example, by determining the constant feed current or the constant drive torque of the servo motor when the turning station turns slowly forward and backward.

It is advantageous to take into account the friction loss braking torque of the turning station or the corresponding parameter in such a way that the target turning acceleration curve exhibits a sudden drop in angular velocity as a result of the friction loss braking torque during the transition from the acceleration phase to the deceleration phase of the turning increment. Considering this aspect, the target turning acceleration curve can be optimized so that the acceleration phase and/or the deceleration phase can be designed to be even "smoother".

It is also preferred if the friction loss braking torque of the turning station and/or a supply current corresponding to the friction loss is determined before calculating the target braking torque and/or a target braking supply current of the servo motor and is taken into account accordingly when calculating the target braking torque and/or the target braking supply current of the servo motor.

In yet another preferred embodiment of the method, the target turning acceleration curve of the turning station is set in such a way that the target turning deceleration in the deceleration phase of the turning increment is numerically smaller than the target turning acceleration in the acceleration phase of the turning increment. This favors the decay of any oscillations at the end of the turning increment.

Advantageously, the friction loss braking torque of the turning station or the feed current corresponding to the friction loss braking torque is determined with a test run in which the turning station is turned with the servo motor at preferably uniform angular velocity, in particular is turned back and forth, preferably by a turning angle which corresponds to the turning angle of the turning station per turning increment. In this way, realistic operating conditions prevail when determining the friction loss braking torque of the turning station or the supply current corresponding to the friction loss braking torque.

A second aspect of the invention relates to a punch press having a stacking tool with a turning station driven by a servo motor, the punch press having a controller for operating the turning station according to the method set forth previously in accordance with the first aspect of the invention.

It is preferred that the control system for operating the turning station is integrated into the press control system. This makes it possible to have a uniform and coherent system, and existing control functions for the press control can also be used for controlling the turning station.

BRIEF DESCRIPTION OF THE DRAWINGS

Further preferred embodiments of the invention are apparent from the dependent claims and from the description, which now follows with reference to the figures. Thereby it is shown in:

FIG. 8 the angular velocity of the defined target turning acceleration curve of the second turning station 6 over the entire turning increment when the determined friction loss braking torque is taken into account; and FIG. 9 the angular velocity of the defined target turning acceleration curve of the third turning station 7 over the entire turning increment, taking into account the determined friction loss braking torque.

DETAILED DESCRIPTION

Figure 1:
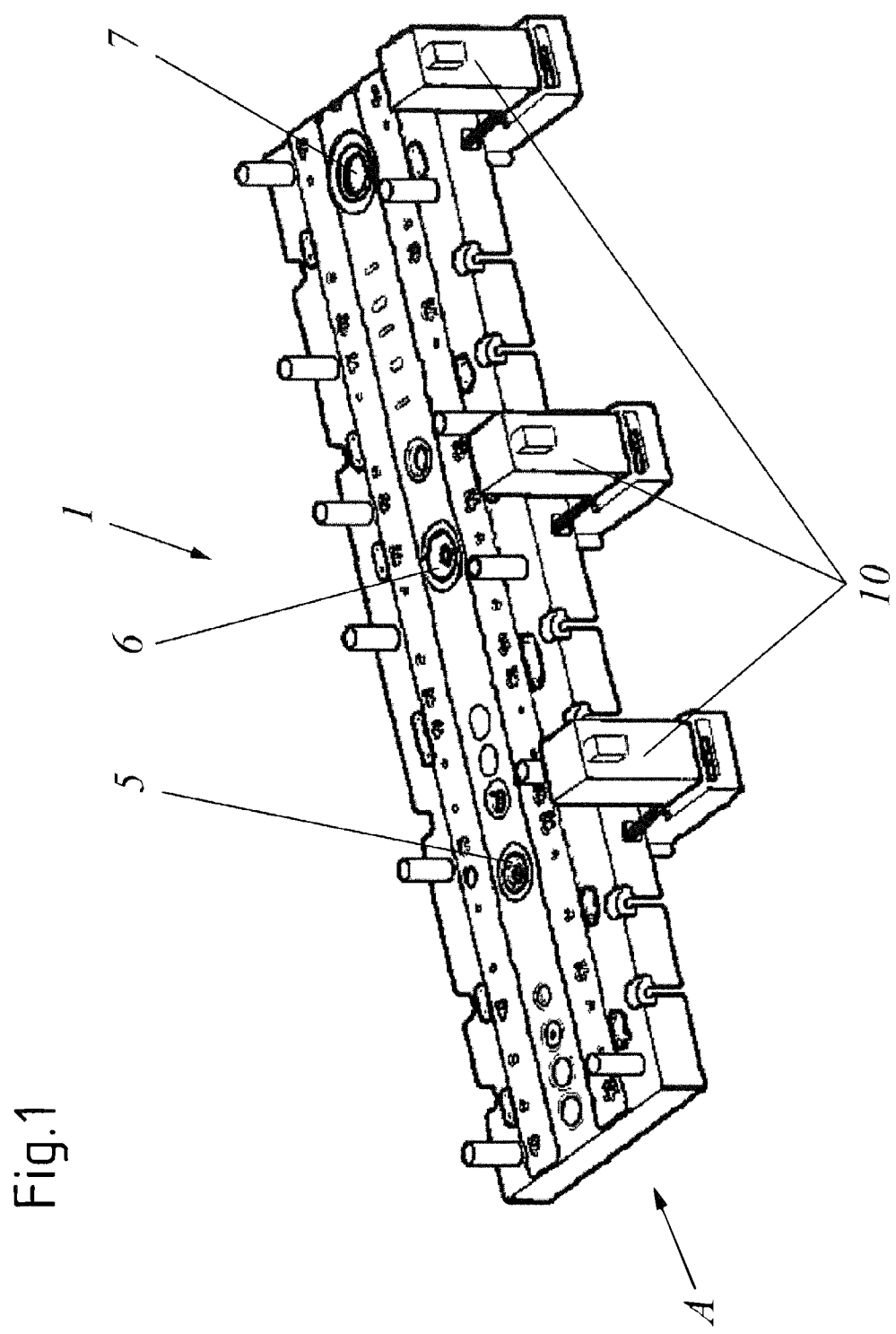
FIG. 1 a simplified illustration of the lower part of a progressive progressive die cutting tool for the production of three different sheet metal stacks for an electric motor.
Figure 2:
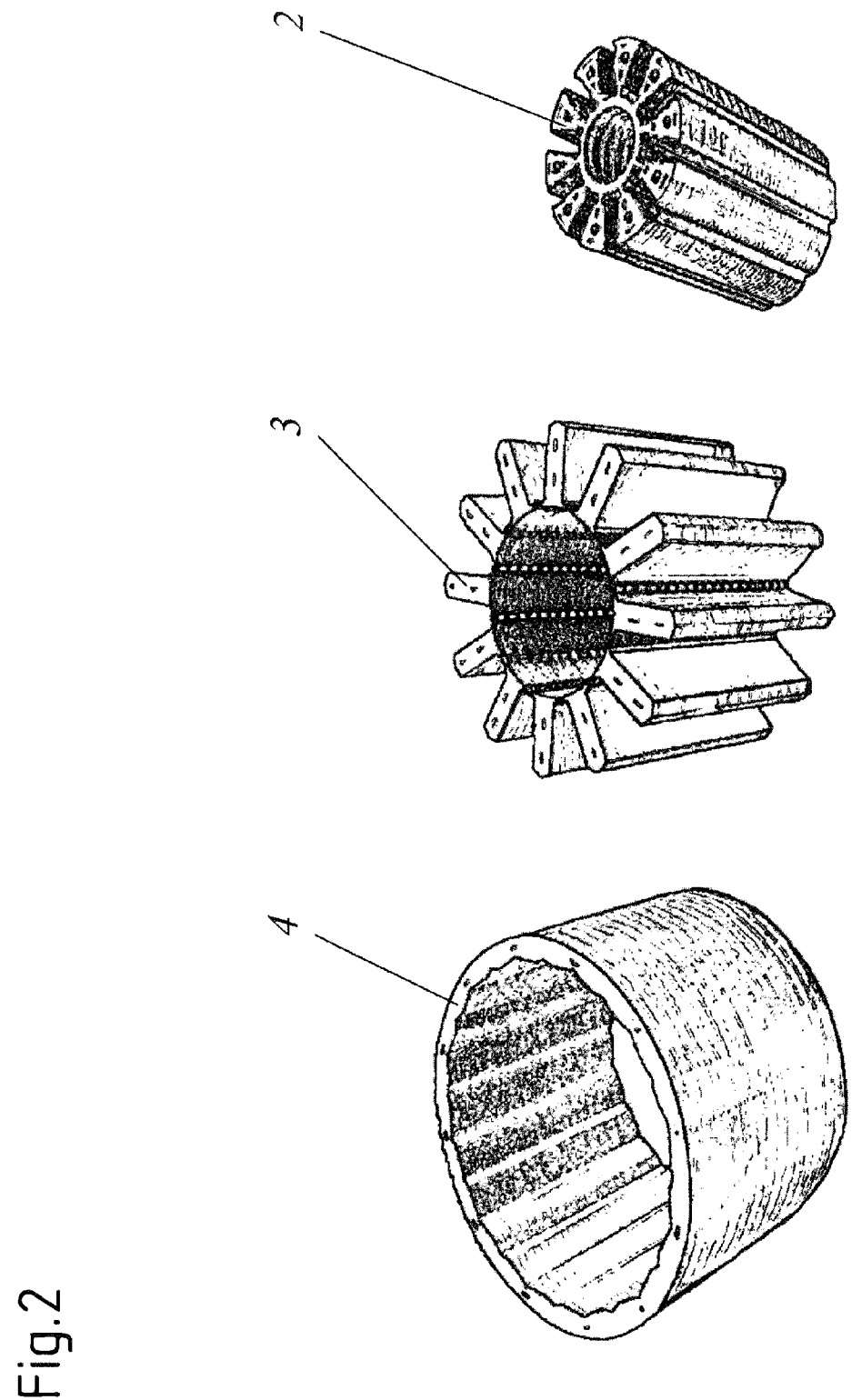
FIG. 2 a top view of the three sheet stacks produced with the progressive die cutting tool according to FIG. 1.

FIG. 1 shows a simplified illustration of the lower part of a progressive progressive die cutting tool 1 for producing the three different sheet metal stacks 2, 3, 4 for an electric motor, which are shown in FIG. 2 in top view. The first sheet metal stack 2 forms the rotor of the motor, the second sheet metal stack 3 forms the stator star of the motor and the third sheet metal stack 4 forms the stator ring of the motor.

The progressive progressive die cutting tool 1 has three turning stations, which are designated by the reference numbers 5, 6 and 7. In the present case, the band travel direction A through the tool 1 runs from left to right.

The production sequence in tool 1 starts with the smallest part. Accordingly, the rotor sheet metal stacks 2 are stacked in the first turning station 5, the stator star sheet metal stacks 3 in the second turning station 6 and the stator ring sheet metal stacks 4 in the third turning station 7.

The connection of sheet metal to sheet metal is achieved here using the so-called clinching process, which is known to the person skilled in the art and therefore does not need to be described in more detail here. Alternatives to this would be joining the individual sheets by means of laser welding, baking varnish or glue.

Figure 3:
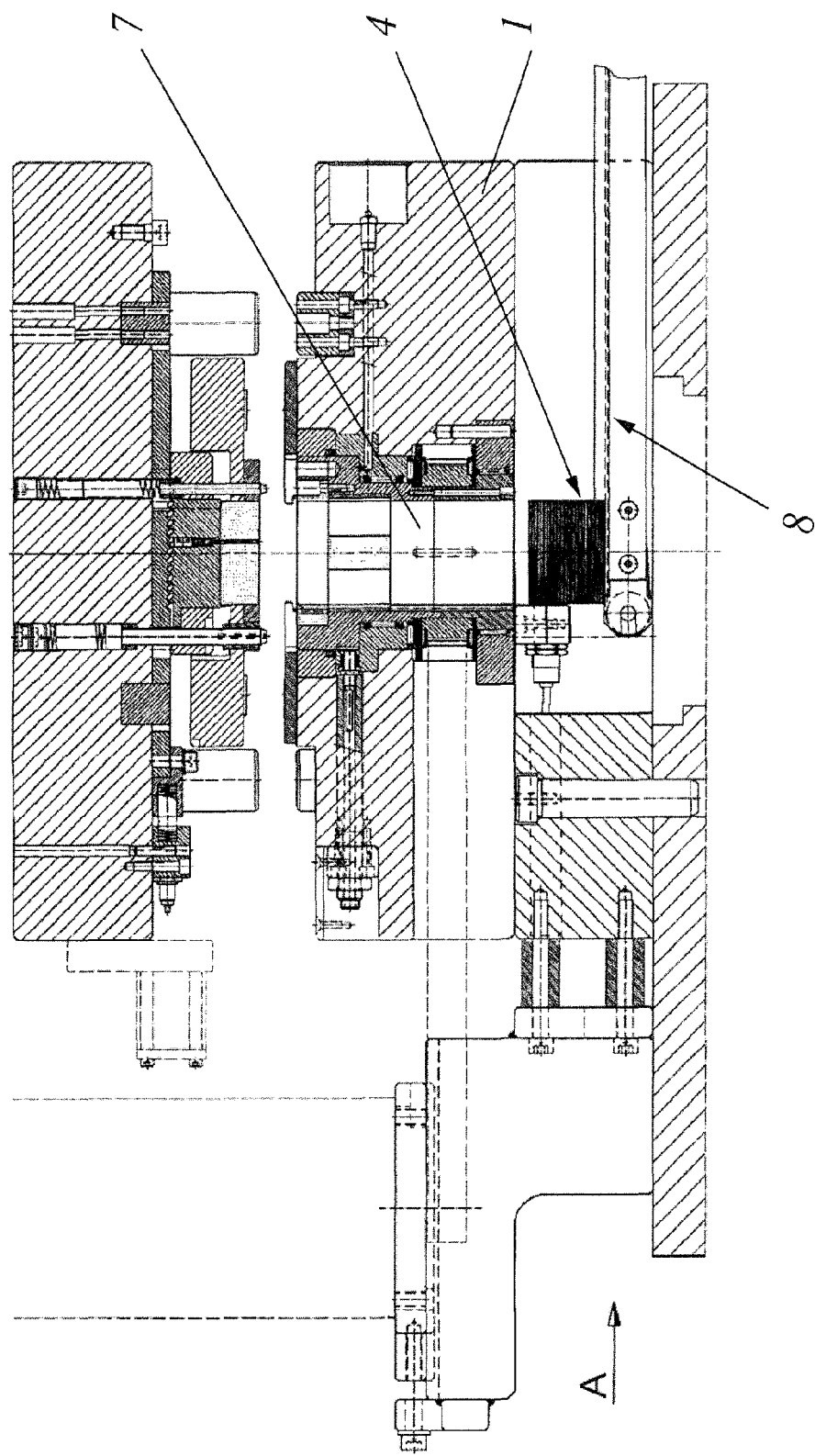
FIG. 3 a vertical section transverse to the band travel direction through the progressive die cutting tool from FIG. 1 in the area of one of the turning stations.

FIG. 3 shows a vertical section transverse to the band travel direction through the progressive progressive die cutting tool 1 in the area of the third turning station 7.

The sheet stacks 2, 3, 4 must be turned during stacking because differences in sheet thickness can exist across the width of the sheet strip to be processed and these would always lead to skewed sheet stacks when stacked at the same point. With the turning of the sheet stacks, the presumed sheet metal thickness differences move in a circle and the result is a cylindrical stack.

The rotor sheet stack 2 has a pitch of 10. This results in a turning angle of 36° per turning increment D for this sheet stack 2. The stator star has 12 beams, which results in a turning angle of 30° per torsion increment D for the stator star laminated core 3 and the associated stator ring laminated core 4. The turning stations 5, 6, 7 are each rotated by means of servo motors 10 via a toothed belt drive. The servo motors 10 each have, for example, a power of 3000 W and a nominal torque of 19.1 Nm. The stack height is monitored and controlled by counting the individual sheets and the measured band thickness. If the stack is high enough, switchable punches are used to cut out the interleavings for the clinching process so that a gap is created before the next stack is started to be stacked. The finished stacks—in the situation shown in FIG. 3 these are stator ring sheet metal stacks 4—fall downwards onto conveyor belts 8, which guide them away from the tool 1 at right angles to the band travel direction.

The turning stations 5, 6, 7 also serve as sheet stack brakes. They must provide the necessary resistance when the individual sheets are joined. An important quality feature of the finished sheet stacks 2, 3, 4 is their holding force. This is checked repeatedly in random samples during the production process.

In the present case, the progressive die-cutting tool 1 is mounted on an automatic die-cutting machine which is operated at 480 strokes per minute. A window over a crank angle of 300° is available for turning the turning stations 5, 6, 7. Accordingly, a theoretical turning time t of 104 ms is available for each turning increment D of 36° or 30°. To ensure that at the end of the turning movement there is still sufficient time for demagnetizing or switching the current of the drive motor 10 and for any oscillations to subside, so that one or more catch pins can carry out the fine adjustment of the turning station, the theoretically available turning time t per turning increment D of 104 ms is shortened by a time span $t_{idle}$ of 4 ms, and an available turning time t per turning increment D of 100 ms is assumed for the determination of the target acceleration curves of the turning stations 5, 6, 7.

The servo motors 10 must accelerate different external mass inertias in wide ranges. These depend on the outer radii of the turning stations to the fourth power.

To determine the target parameters, the target turning acceleration curves of the turning stations 5, 6, 7 are set accordingly. In order to achieve the most energy efficient and material-saving turning of the sheet metal stacks possible with the turning stations 5, 6, 7, the available turning time t of 100 ms is evenly divided between the acceleration phase A and the deceleration phase B of the turning increment D in such a way that they immediately follow one another. In other words, acceleration is to take place over the first half of the respective turning angle per turning increment D and deceleration over the second half. In this way, unnecessarily strong accelerations and decelerations are avoided.

Figure 4:
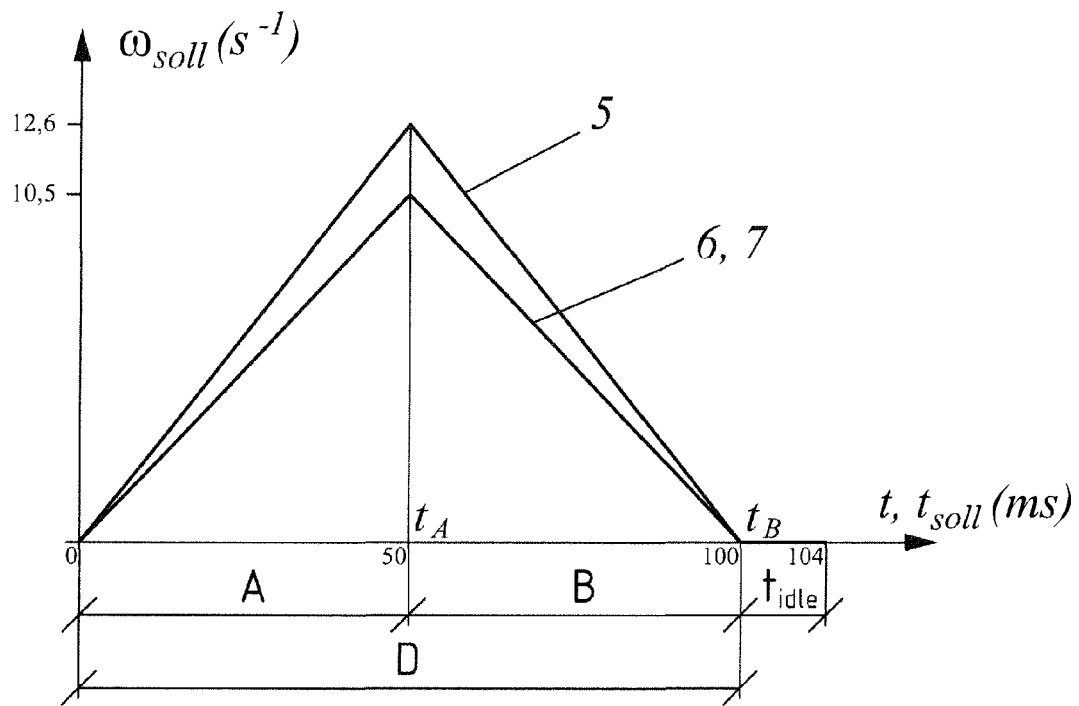
FIG. 4 the defined target turning acceleration curves in the form of the angular velocity of the turning stations over the entire turning increment.

The target turning acceleration curves thus determined for the turning stations 5, 6, 7 are shown in FIG. 4 on the basis of the angular velocity $\omega_{soll}$ ($s^{-1}$) over the turning time t, $t_{soll}$ (ms). As can be seen, the acceleration time to is 50 ms, the deceleration time $t_B$ is also 50 ms, and the settling time $t_{idle}$ is 4 ms. As can also be seen, at the first turning station 5 for the rotor sheet packs 2, after a turning time of 50 ms or after a turning angle of 18°, an angular velocity $\omega_{soll}$ of 12.6 $s^{-1}$ must be achieved, while at the second turning station 6 for the stator star sheet metal stacks 3 and at the third turning station 7 for the stator ring sheet metal stacks 4, identical angular velocities $\omega_{soll}$ of 10.5 $s^{-1}$ must be achieved in each case after a turning time of 50 ms or after a turning angle of 15°. The acceleration and deceleration at the first turning station 5 for the rotor-sheet stacks 2 must be correspondingly greater. This is due to the larger turning angle per turning increment of 36° instead of 30°. Since the specified target turning acceleration curves are symmetrical with respect to the acceleration A and deceleration B phases, the target parameters for the deceleration B phases are the reverse of those for the acceleration A phases.

The turning stations 5, 6, 7, each of which is fully equipped and completely filled with sheet packs 2, 3, 4, perform a reference acceleration run over a reference turning angle which corresponds to half the turning angle of the turning station per turning increment D. Accordingly, the reference turning angle for the first turning station 5 is 18° and for the second turning station 6 and the third turning station 7 it is 15° in each case. The servo motors 10 drive each of the turning stations 5, 6, 7 with the nominal torque of 19.1 Nm, and the reference angular velocities $\omega_{ref}$ and reference turning times $t_{ref}$ are recorded when the reference turning angles are reached.

Figure 5:
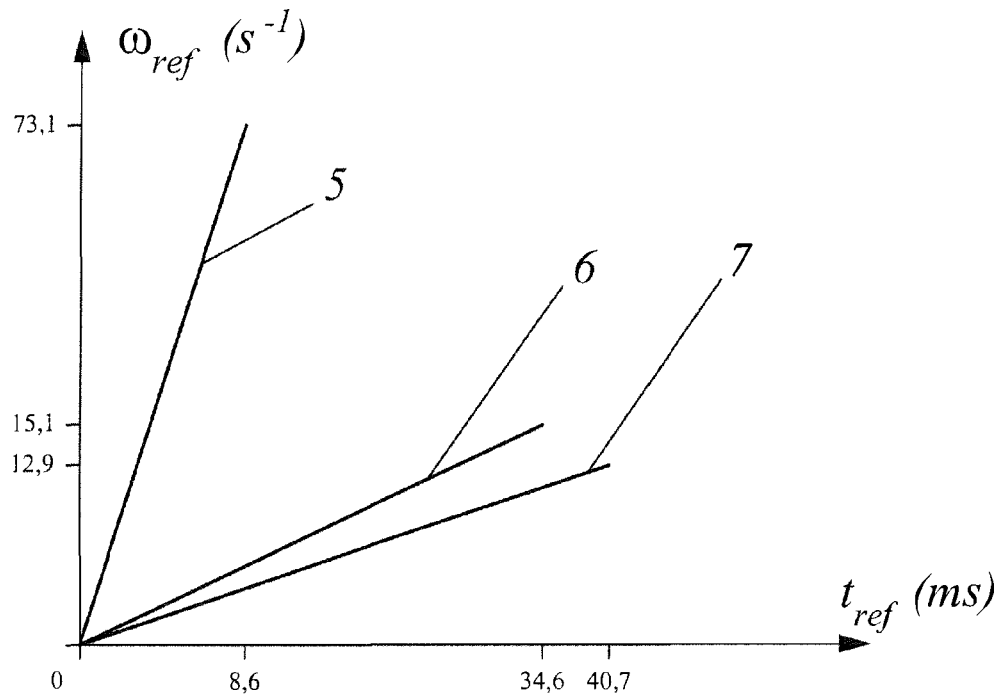
FIG. 5 the curves of the angular velocities of the turning stations over time during the reference acceleration runs.

The reference acceleration curves determined in this way for the turning stations 5, 6, 7 are shown in FIG. 5 using the angular velocity $\omega_{ref}$ ($s^{-1}$) over the turning time $t_{ref}$ (ms).

As can be seen, the first turning station 5 for the rotor ring sheet metal stacks 2 reaches the reference turning angle after a reference turning time $t_{ref}$ of 8.6 ms and has a reference angular velocity $\omega_{ref}$ of 73.1 $s^{-1}$ at the reference turning angle, while the second turning station 6 for the stator ring sheet metal stacks 3 requires a reference turning time $t_{ref}$ of 34.6 ms and reaches a reference angular velocity $\omega_{ref}$ of 15.1 for this, and the third turning station 7 for the stator ring sheet metal stacks 3 requires a reference turning time $t_{ref}$ of 40.7 ms and achieves a reference angular velocity $\omega_{ref}$ of 12.9 $s^{-1}$.

Using the relationships between the reference angular velocities $\omega_{ref}$ or the reference turning times $t_{ref}$ of the turning stations 5, 6, 7 and the reference drive torques of the associated servo motors 10 of 19.1 Nm, the target drive torques of the servo motors 10 are then calculated, which result in the respective target angular velocities $\omega_{soll}$ and target rotation times $t_{soll}$.

For this purpose, the respective target parameters $\omega_{soll}$, $t_{soll}$ and reference parameters $\omega_{ref}$, $t_{ref}$ are set in relation to each other and the reference drive torque is multiplied by this ratio, which is shown below for the first turning station 5 by way of example.

The target angular velocity $\omega_{soll}$ determined for the turning station 5 after a turning angle of 18° is 12.6 $s^{-1}$. The reference angular velocity $\omega_{ref}$ determined with the reference acceleration run of this turning station 5 after a turning angle of 18° is 73.1 $s^{-1}$. The ratio between the determined target angular velocity $\omega_{soll}$ and the determined reference angular velocity $\omega_{ref}$ is a factor of 0.172. Multiplying this by the reference drive torque of the servo motor 10 of 19.1 Nm results in a target drive torque for the first turning station 5 for the rotor sheet metal stacks 2 of 3.28 Nm. The same result is obtained if the reference turning time $t_{ref}$ of 8.6 ms determined for the first turning station 5 is related to the determined target turning time $t_{soll}$ of 50 ms for a turning angle of 18°, which results in a ratio of 0.172, and the reference drive torque of the servo motor 10 of 19.1 Nm is multiplied by this number.

For the second turning station 6 of the stator star sheet metal stacks 3, this calculation results in a target drive torque of the servo motor 10 of 13.23 Nm and for the third turning station 7 of the stator ring sheet metal stacks 4, a target drive torque of the servo motor 10 of 15.54 Nm. The calculated target drive torques for the acceleration phases A also represent the target braking torques for the deceleration phases B, simply with the direction of force reversed.

In a variant of the "teach-in" operation described above, in addition to the reference acceleration runs, further test runs are carried out to determine the friction loss braking torques (frictional torques) M (Nm) of the individual turning stations 5, 6, 7 and are taken into account when determining the target turning acceleration runs of the turning stations 5, 6, 7.

For this purpose, the turning stations 5, 6, 7 with their servo motors 10 are each slowly rotated back and forth by half the turning angle. The frictional torque M is determined by detecting the supply current or the drive torque of the servo motor. If the supply current is detected, the drive torque or friction torque is determined from the known relationship between the supply current and the drive torque of the servo motor 10.

Figure 6:
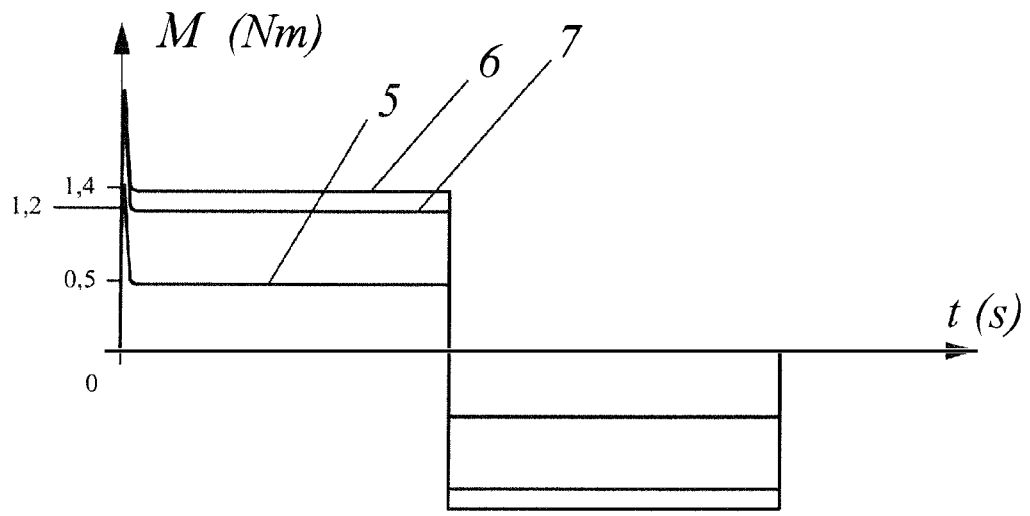
FIG. 6 the curves of the friction loss braking torques of the turning stations over time during the test runs to determine them.

FIG. 6 shows the curves of the friction loss braking torques M (Nm) of the turning stations 5, 6, 7 determined during the test runs over time t (s).

The friction torques M determined in this way, namely 0.5 Nm for the first turning station 5, 1.4 Nm for the second turning station 6 and 1.2 Nm for the third turning station 7, are now each subtracted twice from the acceleration torques and used accordingly as deceleration torques. Using the relationships known from the reference acceleration runs, these deceleration torques can be converted into angular velocities for the definition of a target rotational acceleration curve according to FIG. 4 and deducted accordingly in the deceleration phases B.

Figure 7:
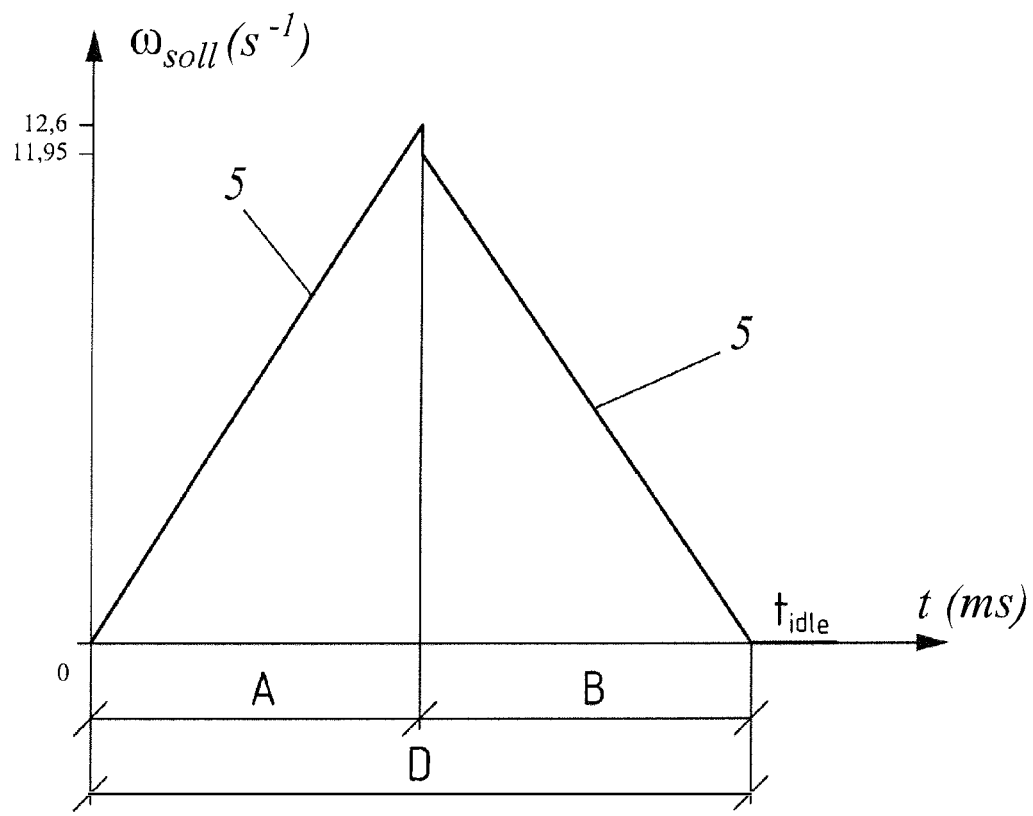
FIG. 7 the angular velocity of the defined target turning acceleration curve of the first turning station 5 over the entire turning increment, taking into account the determined friction loss braking torque.

FIGS. 7 to 9 show the target turning acceleration curves of the individual turning stations 5, 6, 7 over the entire turning increment D determined in this way, taking into account the determined friction loss braking torques M. As can be seen, with these target turning acceleration curves the deceleration phase B is even smoother than with those shown in FIG. 4. When calculating the respective target braking torque for deceleration phase B, the respective friction loss braking torque M is taken into account accordingly by assuming a target angular velocity $\omega_{soll}$ reduced by twice the angular velocity component determined in each case at the transition from acceleration phase A to deceleration phase B.

The process steps described above are carried out automatically by the control system of the automatic punching press when a corresponding "teach-in" function is called up. During regular operation of the automatic punching press, the turning stations 5, 6, 7 of the progressive die cutting tool 1 are then controlled in such a way that the servo motors 10 provide the respective target drive torques and target braking torques for the turning of the turning stations 5, 6, 7.

It is also envisaged that, after the actual "teach-in", the turning time t available per turning increment D, which is dependent on the number of strokes of the presses, is continuously determined, the target turning acceleration curves are adjusted accordingly and new target drive torques and target braking torques are calculated with the parameters known from the reference acceleration runs and used for control. In this way, the turning stations 5, 6, 7 can be automatically operated optimally at any stroke rate of the punch press.

While preferred embodiments of the invention are described in the present application, it should be clearly noted that the invention is not limited to these and may be carried out in other ways within the scope of the claims which now follow.

The invention claimed is:
1. Method A method for operating a servo motor driven turning station of a stacking tool for a punch press, comprising the steps of:
   a) determining a target rotational acceleration curve of the turning station in the acceleration phase (A) of the turning increment (D);
   b) carrying out a reference acceleration run of the turning station while providing a certain reference drive torque by the servo motor or while supplying the servo motor with a certain reference supply current;
   c) determining one or more of the following reference parameters of the reference acceleration run:
      c1) the reference turning acceleration of the turning station or of the servo motor achieved over a certain turning range;
      c2) the reference angular velocity ($\omega_{ref}$) of the turning station or of the servo motor when a certain turning angle is reached;
      c3) the reference turning time ($t_{ref}$) elapsed until a certain turning angle is reached;
      c4) the reference turning angle after a certain turning time has elapsed;
   d) determining one or more of the following target parameters from the target turning acceleration curve:
      d1) the target turning acceleration, which is to be present in a certain turning range;
      d2) the target angular velocity ($\omega_{soll}$), which should be present when a certain turning angle is reached;
      d3) the target turning time ($t_{soll}$) which is to be present when a certain turning angle is reached;
      d4) the target turning angle, which should be present when a certain turning time is reached;
   e) calculating a target drive torque and/or a target supply current of the servo motor, at which the target turning acceleration, the target angular velocity ($\omega_{soll}$), the target turning time ($t_{soll}$) and/or the target turning angle results, from the relationship, known from the reference acceleration run, between the reference turning acceleration, the reference angular velocity ($\omega_{ref}$), the reference turning time ($t_{ref}$) and/or the reference turning angle and the drive torque of the servo motor and/or the supply current of the servo motor; and thereafter
   f) accelerating the turning station with the servo motor in normal production operation in the acceleration phase (A) of the turning increment (D) while providing the target drive torque by the servo motor or while supplying the servo motor with the target supply current.

2. The method according to claim 1, wherein a target turning acceleration curve is determined, according to which the turning station is accelerated substantially uniformly in the acceleration phase (A) of the turning increment (D).

3. The method according to claim 1, wherein the reference acceleration curve is performed while providing the nominal drive torque of the servo motor as the reference drive torque or while supplying the servo motor with the nominal supply current as the reference supply current.

4. The method according to claim 1, wherein the turning angle of the turning station is determined per turning increment (D) and the reference acceleration run is performed over a certain part of the turning angle, in particular over half the turning angle.

5. The method according to claim 1, wherein the available turning time per turning increment (D) is determined and the reference acceleration run is performed over a certain part of the turning time, in particular over half the available turning time.

6. The method according to claim 5, wherein the available turning time per turning increment (D) is determined in such a way that a theoretically available turning time per turning increment is reduced by a time period ($t_{idle}$) which is provided at the end of the turning movement for a stabilization of the system.

7. The method according to claim 5, wherein the available turning time per turning increment (D) or the theoretically available turning time per turning increment (D) is determined as a function of the target stroke rate of the press or as a function of the current stroke rate of the press.

8. The method according to claim 1, wherein the available turning time per turning increment (D) and the turning angle of the turning station per turning increment (D) are determined and a target turning acceleration curve is defined, according to which half the turning angle is reached at the end or after the end of half the available turning time.

9. The method according to claim 8, wherein a target turning acceleration curve is defined, according to which the acceleration phase of the turning increment (D) is completed when the half of the turning angle is reached or after it is reached.

10. The method according to claim 1, wherein the target turning acceleration curve of the turning station is defined over the entire turning increment (D), in particular in such a way that the deceleration phase (B) starts directly after the acceleration phase (A).

11. The method according to claim 10, further comprising the steps of:
   a) determining a target turning deceleration which should be present in the deceleration phase (B) according to the target turning acceleration curve;
   b) calculating a target braking torque and/or a target braking supply current of the servo motor, at which the target turning deceleration results, from the relationship, known from the reference acceleration run, between the reference turning acceleration, the reference angular velocity ($\omega_{ref}$), the reference turning time ($t_{ref}$) and/or the reference turning angle and the drive torque of the servo motor and/or the supply current of the servo motor; and
   c) decelerating the turning of the turning station with the servo motor in the deceleration phase (B) of the turning increment (D) with provision of the target braking torque by the servo motor or with supply of the servo motor with the target braking supply current.

12. The method according to claim 11, wherein the friction loss braking torque of the turning station and/or or a supply current corresponding to the friction loss is calculated before calculating the target braking torque and/or a target braking supply current of the servo motor and is taken into account in the calculation of the target braking torque and/or the target braking supply current of the servo motor.

13. The method according to claim 10, wherein, in particular prior to the determination of the target turning acceleration curve of the turning station, the friction loss braking torque of the turning station and/or a supply current corresponding to the friction loss braking torque is determined and is taken into account in the determination of the target turning acceleration curve of the turning station, in particular in such a way that, as a result of the friction loss braking torque during the transition from the acceleration phase (A) to the deceleration phase (B) of the turning increment (D) as a result of the friction loss braking torque, there is a sudden drop in angular velocity.

14. The method according to claim 13, wherein the friction loss braking torque of the turning station and/or the supply current corresponding to the friction loss braking torque is determined with a test run, during which the turning station is turned by the servo motor with in particular uniform angular velocity, in particular is turned back and forth, in particular by a turning angle which corresponds to half the turning angle of the turning station per turning increment (D).

15. The method according to claim 10, wherein the target turning acceleration curve of the turning station is determined in such a way that the target turning deceleration in the deceleration phase (B) of the turning increment (D) is numerically smaller than the target turning acceleration in the acceleration phase of the turning increment (D).

16. A punch press with a stacking tool with a turning station driven by a servo motor, wherein the punch press has a control for operating the turning station in accordance with the method according to claim 1.

17. The punch press according to claim 16, wherein the control for operating the turning station is integrated into the press control.

* * * * *